No. 821,070. PATENTED MAY 22, 1906.
H. F. WEAVER.
PLOW AND PLANTER.
APPLICATION FILED FEB. 1, 1906.
2 SHEETS—SHEET 1.
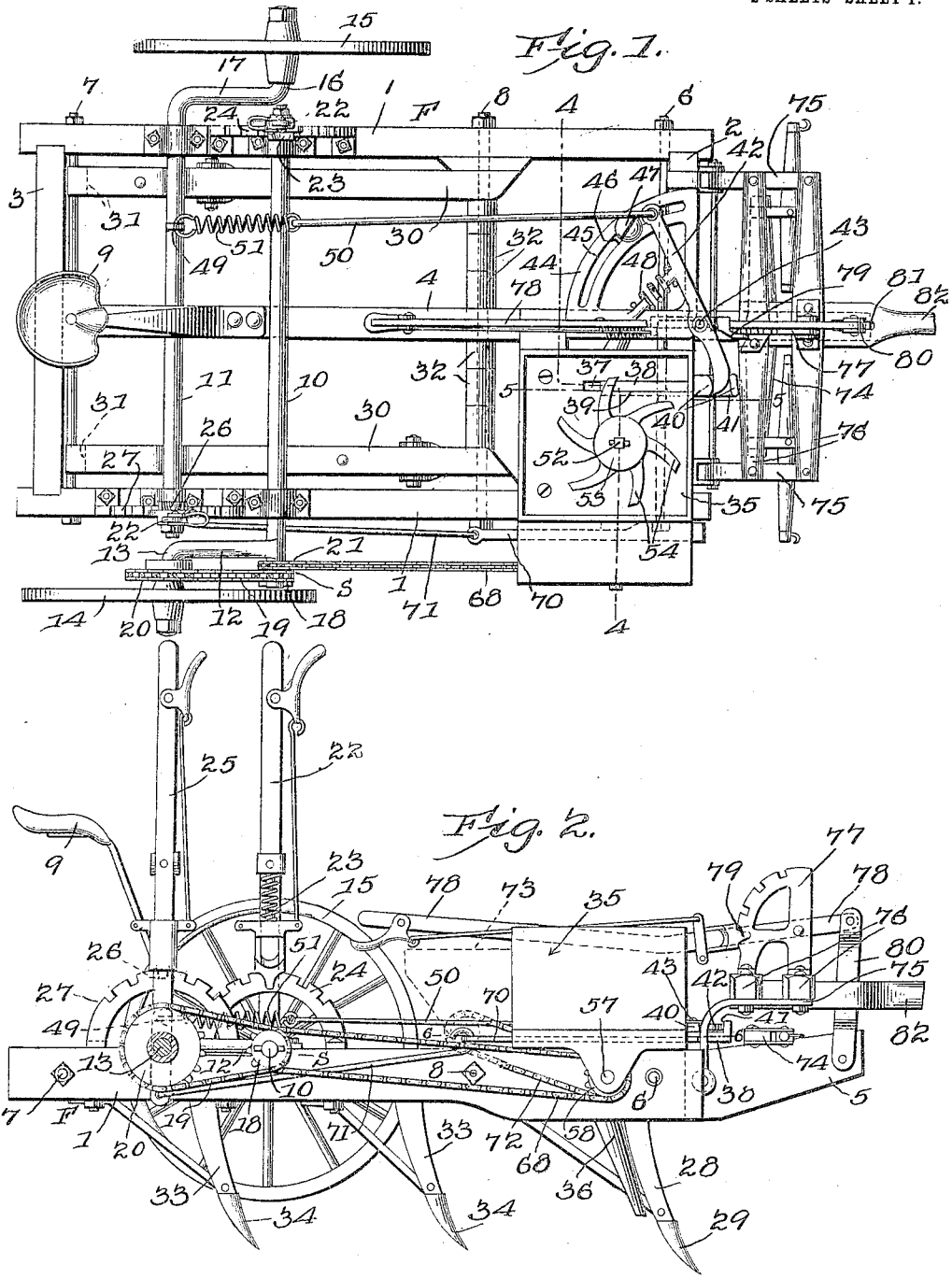
WITNESSES:
Henry F. Weaver, INVENTOR
By C. A. Snow & Co.
ATTORNEYS

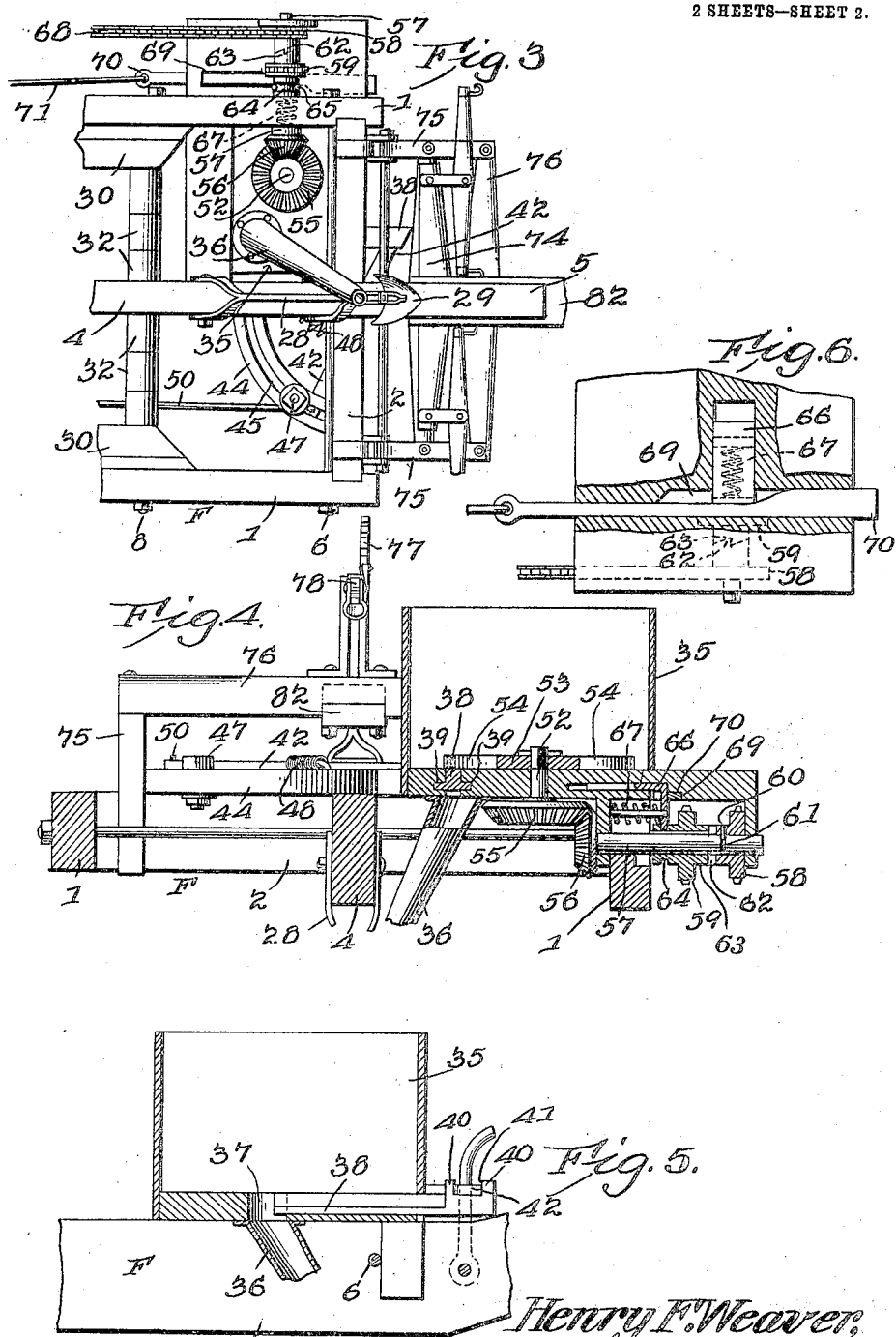

UNITED STATES PATENT OFFICE.

HENRY F. WEAVER, OF LINCOLNTON, NORTH CAROLINA, ASSIGNOR OF ONE-HALF TO GEORGE W. RABB, OF NEWTON, NORTH CAROLINA.

PLOW AND PLANTER.

No. 821,070.    Specification of Letters Patent.    Patented May 22, 1906.

Application filed February 1, 1906. Serial No. 299,015.

*To all whom it may concern:*

Be it known that I, HENRY F. WEAVER, a citizen of the United States, residing at Lincolnton, in the county of Lincoln and State of North Carolina, have invented a new and useful Plow and Planter, of which the following is a specification.

This invention relates to combined plows and planters—that is to say, to machines having means for opening furrows in the ground for the reception of fertilizing material or seed, or both, for dropping or distributing such fertilizing material and seeds, and for bedding the ground.

The objects of the invention are to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a top plan view of a machine constructed in accordance with the principles of the invention. Fig. 2 is a side elevation, the near wheel having been removed. Fig. 3 is a bottom plan view of a portion of the machine. Fig. 4 is a transverse sectional view taken on the plane indicated by the line 4 4 in Fig. 1. Fig. 5 is a sectional detail view taken on the plane indicated by the line 5 5 in Fig. 1. Fig. 6 is a horizontal sectional detail view taken on the plane indicated by the line 6 6 in Fig. 2.

Corresponding parts in the several figures are indicated throughout by similar characters of reference.

The frame F of the improved implement may be constructed either of wood or metal, said frame being of rectangular shape and comprising the side members 1 1, the front and rear cross-bars 2 3, and a central longitudinal bar or member 4, which is extended forwardly of the front cross-bar, so as to form a bracket 5. The side members 1 1 are spaced apart by the front and rear cross-bars 2 3 and are connected adjacent to said cross-bars by means of bolts or tension-rods 6 and 7. An additional cross-bolt 8 connects the sides of the frame intermediate the front and rear ends, the purpose of which will be presently set forth. The bolts or rods 6, 7, and 8 are extended transversely through the central longitudinal frame member 4, and the latter near its rear end supports a seat 9 for the driver or operator.

The side members 1 1 of the frame are provided with bearings for two transverse shafts or axles 10 and 11, the former of which is located slightly in advance of the latter. The shaft 10 is provided near one of its ends with a crank 12, having a spindle 13, upon which one of the carrying-wheels 14 is journaled. The other carrying-wheel 15 is journaled upon a spindle 16 at the extremity of the crank 17, which is formed upon the shaft 11 at the opposite side of the machine. The extremity of the shaft 10, near which the crank 12 is located, carries a double sprocket S, one of the members of which, 18, is connected, by means of a chain 19, with a sprocket-wheel 20, which is suitably connected with the carrying-wheel 14 or with the hub of said wheel. The other member, 21, of the sprocket S serves for the transmission of motion to a fertilizer-distributer, as will be presently more fully described.

The shaft or axle 10 is provided with an adjusting-lever 22, having a suitably-operated spring-actuated stop member 23, adapted to engage a quadrant 24, mounted upon one of the side bars of the frame of the machine. The shaft or axle 11 is in like manner provided with an adjusting-lever 25, having a spring-actuated stop member 26, engaging a quadrant 27 upon the frame of the machine. By means of these levers the shafts or axles may be adjusted independently of each other to regulate the position of the carrying-wheels and to raise or lower the frame, as may be required.

The central longitudinal frame-beam 4 carries a standard 28, equipped with a furrow-opener 29. Plow-beams, as 30, are mounted upon the bolt or cross-bar 8, and said beams are provided at their rear ends with notches 31, engaging the bolt or cross-bar 7. The bolt 8 is provided with a plurality of spacing-sleeves 32, which latter may be utilized for the purpose of spacing the beams 30 from each other and from the side members of the frame, as will be readily understood. The beams 30 are provided with standards 33, carrying listers or bedding-plows 34 or earth-engaging blades of any suitable or desired character.

The frame of the machine supports near its front end a box or hopper 35, having a downwardly-extending discharge-tube 36, which terminates directly in rear of the furrow-opener 29. The upper end of the tube 36 communicates with an aperture 37 in the bottom of the hopper, and said aperture is capable of being regulated or closed, as may be required, by means or a slide 38, that moves in a longitudinal groove 39 in the bottom of the hopper. The forward end of the slide 38, which extends through the front wall of the hopper, is provided with upstanding flanges 40, between which is formed a notch or recess 41 for the reception of one end of a lever 42, fulcrumed upon the frame of the machine at 43.

44 is a segment having a slot 45, which is concentric with the fulcrum of the lever 42, and in said slot moves a stop member 46, adjustable by means of a set-screw 47, said stop member being disposed in the path of the lever 42, the movement of which may thus be regulated. A suitably-disposed spring presses against the lever 42, said spring being shown at 48. The tension exerted by this spring tends to actuate the lever to move the slide 38 in a rearward direction, so as to close the slot or feed-opening 37. The free end of the lever 42 is connected with a crank 49 upon the shaft or axle 11 by means including a connecting-rod 50 and a spring 51, the tension of which is exerted to actuate the lever 42 to move the feed-slide 38 in a forward direction, the movement being limited by the stop member 46, which latter, as will thus be seen, may be adjusted to gage or regulate the size of the feed-opening in the bottom of the hopper.

The bottom of the hopper is provided with bearings for a vertically-disposed shaft or arbor 52, carrying at its upper end a distributing-wheel 53, which is provided with a plurality of curved radiating arms or spokes 54, and it is desired to be understood that while distributing-wheels in this class of devices are customarily provided with only four arms or spokes the wheel used in the present device is provided with six such arms or spokes, whereby the fertilizing material contained in the hopper will be more thoroughly disintegrated and conveyed to the feed-aperture.

The shaft or arbor 52 carries at its lower end a bevel-gear 55, meshing with a pinion 56 upon a horizontally-disposed shaft 57, the latter carrying a loose sprocket-wheel 58 and a slidable sprocket-wheel 59, which latter is rotatable with the shaft. The loose sprocket-wheel 58 is prevented from sliding movement upon the shaft as by means of a pin 60 extending through the hub thereof and engaging an annular groove 61 in the shaft. The sprocket-wheels 58 and 59 are provided with interengaging clutch members 62 and 63. The hub of the slidable sprocket-wheel 59 has an annular groove 64, engaged by a fork 65, formed upon a suitably-supported L-shaped sliding member 66, which is actuated by a spring 67, whereby it is forced in the direction of the loose sprocket-wheel 58, thereby causing the clutch members of the sprocket-wheels 58 and 59 to engage each other. The loose sprocket-wheel 58 is connected, by means of a chain or link belt 68, with the sprocket member 21 of the wheel S, journaled upon the extremity of the shaft or axle 10, as hereinbefore described.

The bottom of the hopper is provided with a groove or channel 69 for the accommodation of a wedge member 70, which is disposed adjacent to the downward-extending arm of the L-shaped spring-actuated member 66, whereby the shifting of the movable sprocket-wheel 59 is effected, said wedge member being adapted to push the member 66 against the tension of the spring 67, so as to move the sprocket-wheel 59 in one direction, it being moved in the opposite direction by the action of the spring when the wedge member 70 is moved out of engagement with the L-shaped bracket member 66. The wedge member 70 is connected, by means of a link or rod 71, with the lower end of the adjusting-lever 25, so that the wedge member will be operated by means of said lever. The lever 25, as hereinbefore stated, is connected with the shaft or axle 11, having the crank 17, upon which the carrying-wheel 15 is supported. When the lever is manipulated to oscillate the shaft or axle in such a manner as to move the wheel in a downward direction with relation to the frame, thus elevating the frame for transportation, the wedge member 70 is moved in a rearward direction, moving the slide 66 against the tension of the spring 67 and moving the sprocket-wheel 59 to a position where its clutch member will be out of engagement with the clutch member of the sprocket-wheel 58, thus causing the latter to rotate idly upon the shaft 57. By the same movement of the shaft 11 the arm or crank 49 will move in a forward direction, thus releasing tension upon the lever 42 and causing the latter to be vibrated under the tension of the spring 48, thus causing the slide 38 to be moved to a position where it obstructs the feed-opening 37. Adjustment of the carrying-wheel 14 may be effected at any time by means of the lever 22 without affecting the operation of the chain 68, whereby motion is transmitted to the loose sprocket-wheel 58 upon the shaft 57, the sprocket-wheel 20 being concentric with the double sprocket S upon the shaft 10. It will thus be seen that the frame of the machine may be very easily raised or lowered to place the plows or ground-engaging members into or out of operative position. It will further be seen that when the plows are placed in operative position the operating mechanism of the fertilizer-distributer will be thrown into gear, while said mechanism will be automatically thrown out of gear when the plows are raised to a non-operative position. It will also be seen that the carrying-wheels may be readily adjusted to various conditions of the surface of the soil, one of the carrying-wheels being used, if desired, as a land-wheel and the other as a furrow-wheel.

The sprocket-wheel 59 may be utilized, when desired, for the purpose of transmitting motion, as by means of a chain, a portion of which has been shown at 72, to the operating mechanism of a seed-hopper, which has been shown in dotted lines at 73 in Fig. 2 of the drawings. It will thus be seen that by simply adding the seed-hopper the machine may be used for simultaneously distributing fertilizing material and seeds, such as corn, peas, and the like.

The draft attachment of the improved machine includes an evener or equalizer 74, which has been shown as directly mounted upon the forwardly-extending bracket portion 5 of the longitudinal frame member 4. Hingedly connected with the front cross-bar 2 of the frame are brackets 75, constructed somewhat like ordinary thill-irons, said brackets supporting a pair of cross-bars 76, carrying a quadrant 77. Pivoted upon said quadrant is a lever 78, having a stop member 79, adapted to engage the teeth or notches of the quadrant for the purpose of retaining the lever at various adjustments, and said lever is connected with the bracket member 5 by means of a link 80, extending through a slot 81 in a tongue 82, which is rigidly connected with and extends forwardly from the cross-bars 76. It will be readily understood that when in practice the front end of the tongue is supported, as by means of an ordinary neck-yoke, upon the necks of the draft-animals the frame of the machine may be adjusted, by means of the lever 78, so as to vary the inclination of the plows, thus causing the latter to enter into the ground to the desired depth.

From the foregoing description, taken in connection with the drawings hereto annexed, the operation and advantages of this invention will be readily understood.

The construction of the improved machine is simple, and said machine may be successfully employed for the purpose of preparing land for the reception of seed by plowing and bedding the same and at the same time distributing fertilizing material. Seed-dropping mechanism may be added when desired. The distance between the bedding-plows or listing-plows may be readily changed, and the efficiency of the machine as a whole is greatly increased by the facility with which various adjustments may be effected, as will be understood from the foregoing description.

Having thus described the invention, what is claimed is—

1. A plow-carrying frame, a hopper upon said frame, feeding mechanism in the hopper including a shaft having a sprocket-wheel, an axle journaled upon the frame having a wheel-carrying crank and provided with an extension concentric with the axis of the axle, a double-sprocket member journaled upon said extension, a sprocket-wheel connected with the carrying-wheel journaled upon the crank of the axle, a chain connecting said sprocket-wheel with one member of the double sprocket journaled upon the extension of the axle, and means for transmitting motion from the other member of said double sprocket to the planting mechanism of the hopper.

2. A plow-carrying frame, a hopper supported upon the frame, a discharge-aperture in the hopper, a regulating-slide for said aperture, agitating means in the hopper and operating mechanism therefor, an axle journaled upon the frame and having a wheel-carrying crank, adjusting means for said axle, and means connected with and operated by the axle for actuating the slide to close the aperture in the hopper and for throwing the operating mechanism of the agitating means in the hopper out of gear when the wheel is lowered to elevate the frame for transportation, and vice versa.

3. A hopper having a discharge-aperture, a slide to regulate said aperture, a spring-actuated lever engaging said slide, a stop disposed adjustably in the path of the lever, a rock-shaft having a crank, and means including a spring and a link connecting said crank with the spring-actuated lever to operate the latter against the tension of its actuating-spring.

4. A hopper having a discharge-aperture, a slide to regulate said aperture having a recess, a spring-actuated lever engaging the recess in the slide, a supporting-plate having a segmental slot concentric with the fulcrum of the lever, a stop member adjustable in said slot in the path of the lever, a rock-shaft having a crank, and means including a spring and a link connecting said crank with the lever to move the latter forcibly against the tension of its actuating-spring.

5. A plow-carrying frame, a hopper supported upon the frame and having a discharge-aperture, an agitator-shaft, an agitating wheel or disk mounted upon said shaft, an operating-shaft, intermeshing bevel-pinions upon the operating-shaft and the agitator-shaft, sprocket-wheels upon the operating-shaft having interengaging clutch members one of said sprocket-wheels being feathered upon the shaft for slidable movement thereon, a slidable spring-actuated member engaging the slidable sprocket-wheel to move it in the direction of the opposite sprocket-wheel, a slidably-supported wedge member engaging the spring-actuated slide to force it against the tension of its actuating-spring, a cranked wheel-carrying axle upon the plow-carrying frame, an adjusting-lever upon said axle, and a link connecting said adjusting-lever with the wedge member.

In testimony that I claim the foregoing as my own I have hereto affixed my signature in the presence of two witnesses.

HENRY F. WEAVER.

Witnesses:
 T. C. CLIFTON,
 G. C. LITTLE.